(12) United States Patent
Sauermann et al.

(10) Patent No.: US 7,487,165 B2
(45) Date of Patent: Feb. 3, 2009

(54) COMPUTER IMPLEMENTED METHOD FOR RETRIEVING HIT COUNT DATA FROM A DATA BASE SYSTEM AND ACCORDING COMPUTER PROGRAM PRODUCT

(75) Inventors: Volker Sauermann, Heidelberg (DE); Arne Schwarz, Walldorf (DE); Axel Von Bergen, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 976 days.

(21) Appl. No.: 10/901,440

(22) Filed: Jul. 29, 2004

(65) Prior Publication Data

US 2005/0210011 A1 Sep. 22, 2005

(30) Foreign Application Priority Data

Jul. 30, 2003 (EP) ................... 03017248

(51) Int. Cl.
*G06F 17/30* (2006.01)
(52) U.S. Cl. .................. 707/100; 707/2; 707/5
(58) Field of Classification Search ........... 707/2–6, 707/100, 1, 101
See application file for complete search history.

(56) References Cited

U.S. PATENT DOCUMENTS

| | | | | |
|---|---|---|---|---|
| 5,943,063 | A * | 8/1999 | Dowling | 345/471 |
| 6,069,978 | A * | 5/2000 | Peairs | 382/254 |
| 6,513,032 | B1 * | 1/2003 | Sutter | 707/3 |
| 6,957,210 | B1 * | 10/2005 | Ramesh | 707/2 |

FOREIGN PATENT DOCUMENTS

| WO | WO 02/061612 A2 * | 8/2002 |
|---|---|---|
| WO | WO 02/061613 A2 * | 8/2002 |

OTHER PUBLICATIONS

Chen C. M. et al "The Implementation and Performance Evaluation of the ADMS Query Optimizer: Integrating Query Reslt Caching and Matching" Lecture Notes in Computer Science. vol. 779 (Mar. 1994) pp. 323-336.
Derthick M et al, "Efficient multi-object dynamic query histograms" Proceedings, 1999, IEEE Symposium on Information Visualization (Oct. 1999) pp. 84-91.
Haas P et al, "Sequential sampling procedures for query size estimation" Proceedings of the 1992 ACM Sigmod International Conference on Management of Data (1992) pp. 341-350.
Jae-Heon Cheong et al "A Boolean query processing with a result cache in mediator systems" Advances in Digital Libraries. (May 2000) pp. 218-227.
O'Neil P et al "Improved Query Performance with Variant Indexes" Sigmod Record. vol. 26, No. 2 (Jun. 1997) pp. 38-49.
Yi-Leh Wu et al, "Query estimation by adaptive sampling" Proceedings 18th International Conference on Data Engineering (ICDE 2002) vol. Conf. 18 (Feb. 2002) pp. 639-648.

* cited by examiner

*Primary Examiner*—Cheryl Lewis
(74) *Attorney, Agent, or Firm*—Fish & Richardson P.C.

(57) ABSTRACT

A computer implemented method of retrieving hit count data from data base system comprises the steps of scanning through the bitmap data structure (7R) accessing only each Nth machine word (10f), determining a fuzzy number of hit-relevant bit values of each accessed machine word (10f), calculating an estimated hit count by multiplying the fuzzy number by N, and outputting the estimated hit count from the data base system.

14 Claims, 5 Drawing Sheets

COMPUTER IMPLEMENTED METHOD FOR RETRIEVING HIT COUNT DATA FROM A DATA BASE SYSTEM AND ACCORDING COMPUTER PROGRAM PRODUCT

FIELD OF THE INVENTION

The invention refers to a computer implemented method for retrieving hit count data from a data base system by determining a number of hits in a result bitmap data structure representing a result dataset of a query. The invention further relates to a computer program product for the implementation of this retrieval method.

BACKGROUND OF THE INVENTION

The present invention is relevant for the field of data bases, especially data base systems handling huge numbers of data. In this connection the patent applications WO 02/061612 A2 and WO 02/061613 A2 disclose—amongst others—such data base systems, data structures used therein and query optimizers for such data base systems. The disclosure of both these applications is incorporated herein by reference. These applications especially reflect storage and query strategies based on balanced binary trees.

Furtheron reference is made to European patent application 03 015 365.4 (prior art according to article 54(3) EPC), which basically discloses the method of storing certain query results as bitmaps, which is a very simple and machine-oriented strategy of storing data. Again the contents of this older patent application is incorporated herein by reference.

In case the result of a query exists as a bitmap—the so-called result bitmap—the bits with value 1 in this result bitmap represent datasets in which the query condition is given. Now if a user of a data base system wants to know the number of hits of a query the usual strategy is to count the bits set to value 1 in the result bitmap and to thus determine the number of relevant datasets. Such exact count is performed by scanning through the bitmap data structure machine word by machine word, determine the set bits and add a value 1 to an according counter in case a set bit was determined. At the end of this process the counter variable contains the exact number of hits.

SUMMARY

Depending on the size of the bitmap data structure this exact counting process may be extensive and runtime consuming on the one hand, whereas the exact number of hits is an information which is more or less worthless to the user. It would be sufficient to provide the user with a rough number of counts to just give him an impression about the hit quantity.

Accordingly it is an object of the invention to provide a method for retrieving hit count data from a data base system and an according computer program product which by giving only a rough or estimated number of hits considerably save runtime and thus expenses in connection with the operation of a data base system.

This object is met by two methodical concepts which are based on the principals of the fuzzy technology.

On the one hand the above mentioned object is met by a computer implemented method of retrieving hit count data from a data base system comprising the steps of scanning through the bitmap data structure accessing only each Nth machine word, determining a fuzzy number of hit-relevant bit values of each accessed machine word, calculating an estimated hit count by multiplying the fuzzy number by N, and outputting the estimated hit count from the data base system.

Apparently the aforesaid manner of a fuzzy count determining a fuzzy number of hit-relevant bit values instead of an exact number is much more economical compared to exact counting. By scanning through the bitmap data structure and accessing only each Nth machine word runtime for this process is roughly reduced to fraction 1/N. The estimated hit count is calculated by multiplying the fuzzy number by N adapting statistical methods known in the art.

The aforesaid way of sampling is exact enough for large hit sets as they are to be found in many data base retrieval scenarios. The larger the result bitmap data structure, the smaller the fuzzy counting error is. Inasmuch this fuzzy counting is not suitable for small hit sets.

Beside the above mentioned fuzzy counting of hits in result bitmap data structures the above discussed object is furtheron met by a computer implemented method of retrieving hit count data from a data base system comprising the steps of generating a fuzzy result bitmap data structure from at least two bitmap structures representing certain data attributes by logically combining only each Nth machine words of both the bitmap structures, determining a fuzzy number of hit-relevant bit values of each valuable machine word in said fuzzy result-bitmap data-structure, calculating an estimated hit count by multiplying the fuzzy number by N, and outputting the estimated hit count from the data base system.

This retrieval process for hit count data is based on a fuzzy concept in which the result bitmap data structure includes valuable information only in each Nth machine word which was generated by a logical operation. These "valuable machine words" contain hits, which can be counted within a runtime which again is reduced to the factor 1/N. To calculate an estimated hit count the fuzzy number of hit-relevant bit values determined on the basis of the fuzzy result bitmap data structure need only be multiplied by this N.

As the fuzzy result bitmap data structure is incomplete concerning the valuable information there might be problems in case a user wants to have retrieved a certain series of datasets, e.g. the first 10 datasets of the result bitmap data structure. In case that the first 10 datasets are not covered by the first machine word of the fuzzy result bitmap data structure relevant datasets lie in machine words that were not considered by the fuzzy logical combination.

To meet with this problem a preferred embodiment of the computer implemented retrieval method comprises the steps of determining whether all required result datasets are represented by said fuzzy result bitmap structure and post-calculating of result datasets until the required number of selected result datasets is reached in the fuzzy result bitmap data structure, and returning the completed entity of selected result datasets to a user interface.

By this preferred embodiment the somewhat incomplete fuzzy result bitmap data structure is completed just at these positions from which valuable information is required. Thus the "unfuzzy operation" is specifically applied only in these positions of the result bitmap data structure where it is necessary. This again means optimal utilization of the computer resources.

Detail Description

Figure 1:
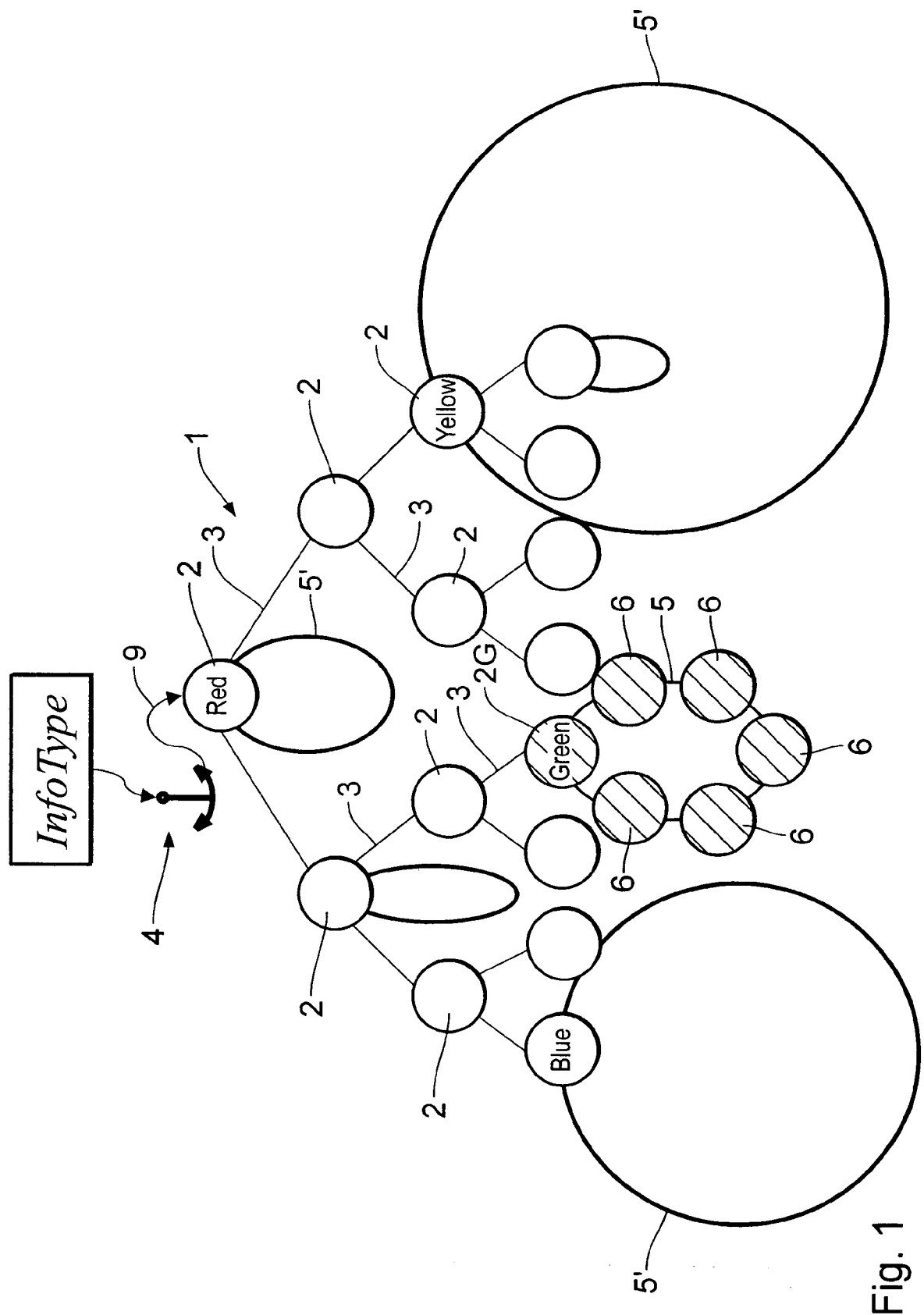
FIG. 1 is a diagram of a tree structure representing a data attribute "color" including so-called rings.

FIG. 1 shows an attribute tree 1 consisting of nodes 2 and branches 3 arranged as a so-called binary tree. Each node 2 represents a certain value of the attribute "color", which attribute is so-called "InfoType" data structure in the data storage system applications of the applicant. The attribute tree 1 is linked to the data structure used in the data storage system by an anchor 4 which is broadly discussed in WO 02/061612 A2.

At the nodes 2 representing the color attributes "red", "blue", "green", "yellow" etc. there are attached so-called rings 5 which represent data elements having the same value, like "green" at the node 2G. This master node 2G plus the further five nodes 6 in the ring 5 have the same attribute value "green". Each individual node 2G, 6 of the ring 5 represents exactly one dataset, in which the attribute color with the value "green" appears. The same principle applies for the other color values and in general for any other attribute for which the same value can appear repeatedly. These other rings 5' are represented as circle in FIG. 1. This drawing figure also symbolizes that the rings 5, 5' can have various sizes, i.e. different numbers of nodes.

In this connection attention is to be drawn to the fact that in such tree structures nodes may have no rings, e.g. if the node represents a unique attribute, like a single costumer number in a client administration program. On the other hand there may be attribute trees with a small number of large rings, e.g. data structures which represent flags—such as the gender—, countries and the like. In this case most of the nodes are not found in the tree branches, but in the rings that are attached to the master nodes of the tree.

Figure 2:
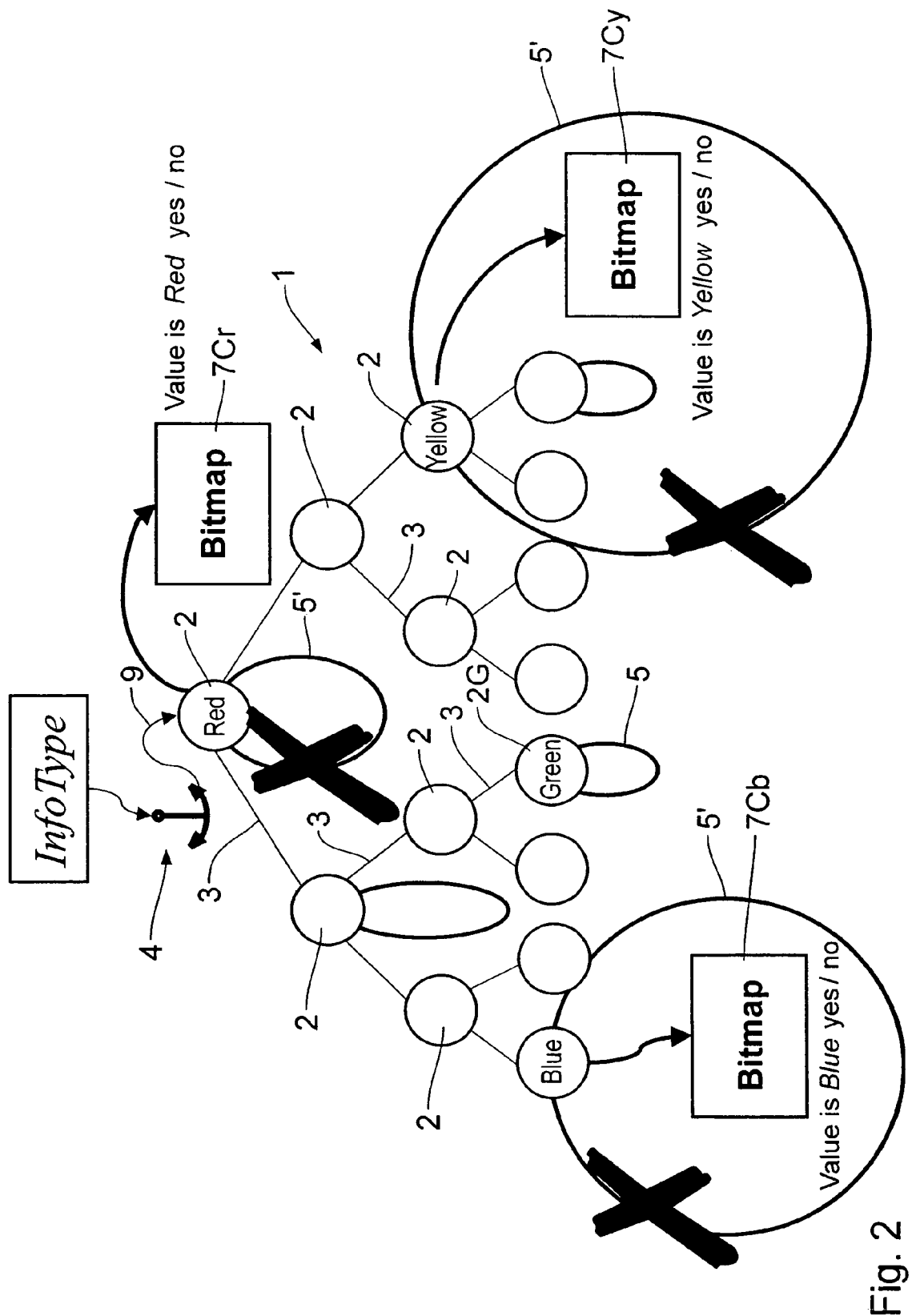
FIG. 2 is a diagram according to FIG. 1 in which some large rings are replaced by bitmaps.

Now the storage and processing of queries is more effective in case when large rings are replaced by bitmaps. This is shown in FIG. 2 in which the large rings 5 attached to the red, blue and yellow master nodes 2 are replaced by bitmaps 7Cr, 7Cb, 7Cy. The ring 5 attached to node 2G "green", however, is not replaced as it only includes six elements and thus is small.

The discrimination between small and large rings is based on runtime measurements for example during startup or also during the runtime of the data storage system and the according computer program. These measurements are intended to determine the number of datasets from which bitmaps for logical combinations are more economical than other query strategies, like the so-called guide mechanism. Reference is made to aforesaid European patent application 03 015 365.4.

For few hits, bitmaps are almost empty and thus uneconomical. For a high number of hits, the guide mechanism is uneconomical because too many guide instances must be individually created and combined. The system can determine the break-even point for the number of elements in a ring and replace all rings that contain more than the break-even number of elements by the bitmaps 7Cr, 7Cb, 7Cy (see FIG. 2). As stated above, in each bitmap one bit represents exactly one dataset in the sequence of the dataset anchor. So if five million datasets are loaded in the data storage system, each bitmap consists of five million bits. In a 32-bit-environment this corresponds to 156250 machine words or to 78125 machine words in a 64-bit-environ-ment. This sums up to 610 kilobytes per bitmap.

Now to give an example, in a bitmap 7Cr for the attribute "color" with the value "red" the bitmap reflects, whether the color "red" appears (bit value=1) or not (bit value=0) in a certain dataset.

Figure 3:
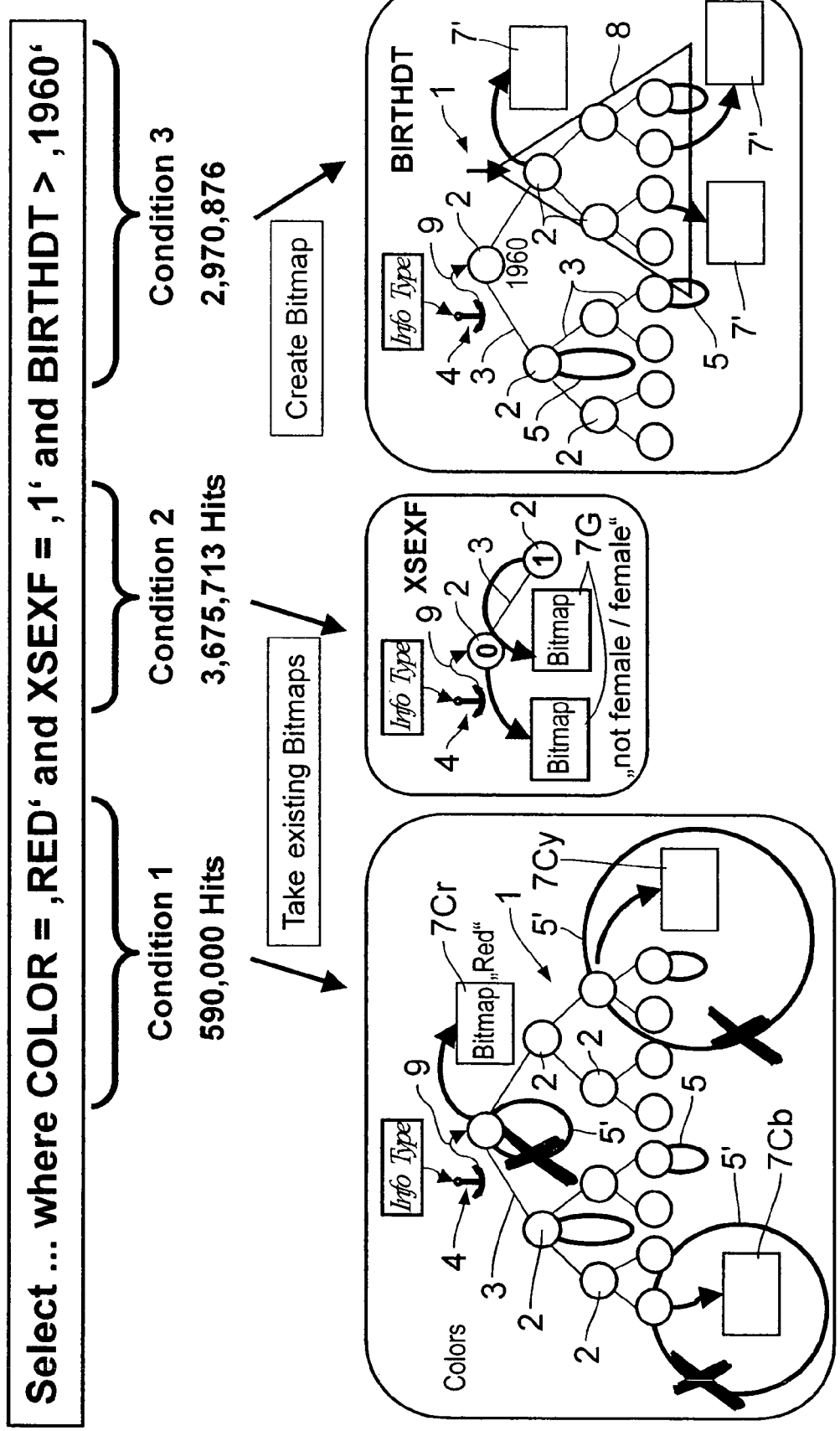
FIG. 3 is a schematic representation of a query with tree conditions reflecting the attribute tree structures of three attributes.

Now FIG. 3 illustrates the way of how a query containing a plurality of attribute conditions is executed. The example query should select all datasets (for example orders for automobiles) for red-colored automobiles sold to women born later than 1960. Accordingly the example query consists of condition 1 (color="red"), condition 2 (gender is female/XSEXF="1") and condition 3 (birthdate BIRTHDT>"1960").

As explained in the previous applications taken into reference the three attributes color, gender and birthdate are arranged in respective attribute trees with element counters which easily and fast give the number of hits for each individual condition. In the example query the number of hits for condition 1 is 590,000, for condition 2 is 3,675,713 and for condition 3 is 2,970,876. The number of hits concerning all three conditions is high enough to evaluate the query with the help of bitmaps.

In this connection the bitmaps 7Cr, 7G for color="red" on the one hand and XSEXF="1" on the other hand are static bitmaps which are already existing and stored in an according memory of the data storage system.

Now as is shown in FIG. 3, lower part the bitmaps 7Cr, 7G for the first two conditions "color" and "gender" already exist and are used directly. By descending through the corresponding attribute tree the required bitmaps 7Cr, 7G for the color "red" and the gender "female" can be located very quickly. In particular the attribute XSEXF for the gender is only a flag with the two values 0 and 1 inasmuch the attribute tree consists of only two nodes with enormous rings which are now replaced by the bitmaps 7G.

For the third condition, a start pointer 9 from anchor 4 is used in the attribute tree 1 for the birthdate BIRTHDT to identify one or more subtrees 8 with valid hits for the condition ">1960". To fulfill this condition allnodes lying to the right of the node with the value "1960" are to be found and associated to bitmaps, or to rings so small that a bitmap is not effective. Finally a node might have no ring, because the relevant value appears only once.

Now to create a bitmap 7B (FIG. 4) for the subtree 8 that contains the nodes which satisfy the condition ">1960", all the bitmaps 7' of the subtree 8 must be logically combined with OR (this occurs machine-word-wise). Furtheron the bits of the small rings and the nodes without rings must be set to 1.

Figure 4:
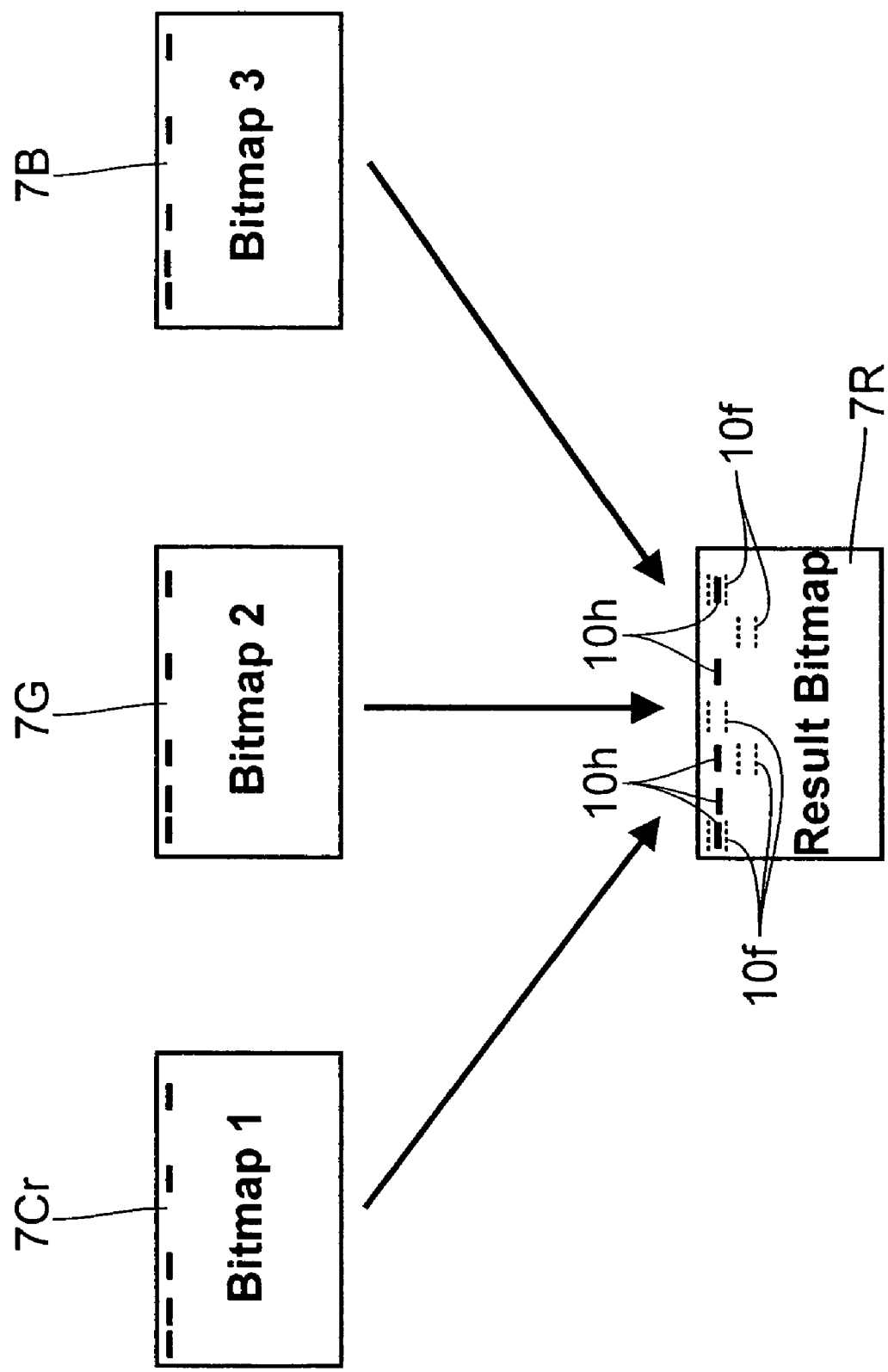
FIG. 4 is a schematic diagram of a query reflecting the creation of a result bitmap.

In this way finally three bitmaps 7Cr, 7G, 7B are reached, one for each condition, as is shown in FIG. 4. These three bitmaps are now combined with the logical operator AND bit by bit in units of machine words, as the CPU can logically combine two machine words in one clock cycle. From this combination of the three bitmaps 7Cr, 7G, 7B for the individual conditions we get a result bitmap 7R, in which all those bits are set to 1 that correspond to datasets that satisfy all three conditions 1, 2 and 3. The dataset or—speaking in the terminology of the applicant—DataCourse satisfying all the conditions is represented by the position in the bitmap and can be retrieved by usual memory mapping.

Now as can readily be realized in connection with the static bitmaps 7Cr, 7G on the one hand and the dynamic bitmap 7B on the other hand there might be the problem that calculating the dynamic bitmap 7B for the condition ">1960" is runtime-consuming and extensive. Now in case the query just alters the condition 1 from color="red" to color="green" the extensive process to determining the dynamic bitmap for the condition ">1960" must be repeated. This is avoided inasmuch, as the dynamic bitmap 7B is stored in a cache memory (not shown) of the data storage system. Thus the dynamically calculated resulting bitmap 7B for the condition ">1960" is not just "thrown away", but kept for a while to be used in future queries.

This calculated bitmap data structure is preferably linked to an attribute tree representing a data entity of said attribute, like the subtree 8 of the attribute tree 1 in FIG. 3 representing the birthdate >1960. Furtheron the dynamically calculated bitmaps can be placed in a separate tree like search structure, which for example is sorted by a combination of operator and value, e.g. ">1960".

Now to determine the frequency of use of a certain dynamic bitmap cache stored in an according memory a linear list preferably following an LRU-(least-recently-used-) principle is used, in which the most frequently used bitmaps can be found at the top of the list and the less frequently used bitmaps go steadily down the list until they reach the end and are removed from the list. This LRU-list is superimposed onto the above mentioned treelike search structure so a fast access to the system and to the cache memory is guaranteed.

Now users of the discussed data base systems commonly require information from the system which is mostly the number of hits in the result bitmap 7R and a certain result dataset, e.g. the first or last M result datasets of the query, e.g. with M=10.

Concerning the first aspect of the number of hits the system according to the invention determines a so-called fuzzy count by scanning through the result bitmap 7R and accessing only each Nth machine word. In FIG. 4 the machine words of the result bitmap 7R containing hits are indicated by short lines bearing reference numerals 10$h$, whereas the accessed machine words are indicated by phantom lines labeled with 10$f$. N might be in the order of 10 to 100, preferably e.g. N=50. In these accessed machine words 10$f$ the number of hit-relevant bit values is determined leading to a fuzzy number of hits. An estimated hit count is based on this fuzzy number by multiplying the latter by N. Finally the estimated hit count is delivered to an output interface of the data base system to give the user the required information of an estimated count data.

Aforesaid hit counting is especially suitable for very large hit sets, such as over one million to five million datasets.

Figure 5:
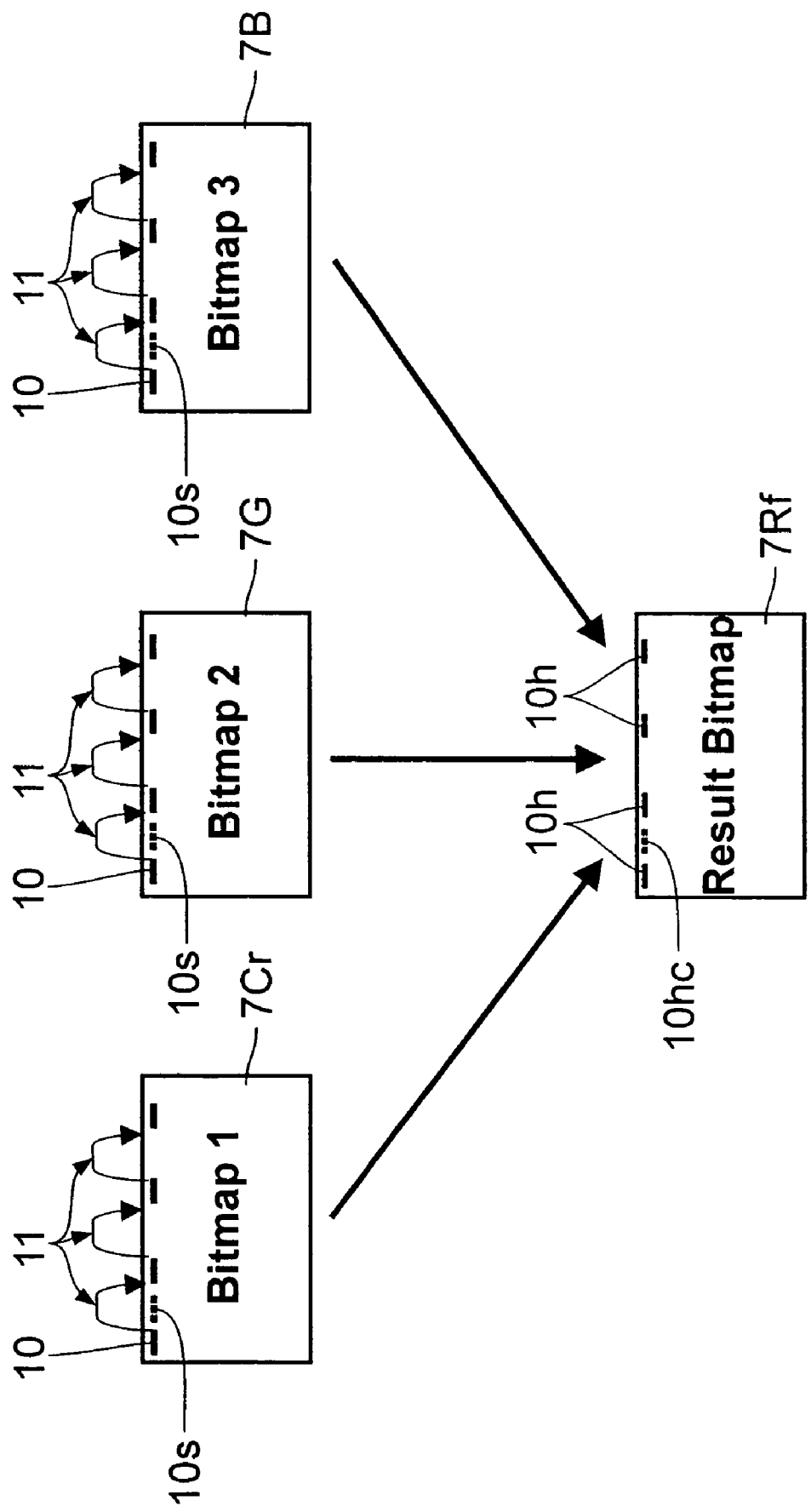
FIG. 5 is a schematic diagram illustrating the fuzzy logical combination of bitmaps to a result bitmap.

FIG. 5 refers to the concept of fuzzy logical combinations, the object of which is to create a result bitmap 7Rf in a runtime saving manner which, however, is not a fully exact mapping of the logical combination of bitmaps 7Cr, 7G and 7B.

In fact only each Nth machine word 10 in the bitmaps 7Cr, 7G, 7B is combined by the respective logical operator. N−1 machine words 10$s$ between accessed machine words 10 are skipped, what is indicated by arrows 11 in FIG. 5.

This fuzzy logical combination means that the result bitmap 7Rf contains valuable information only in the machine words 10$h$ indicated in FIG. 5. The skipped machine words in between do not contain any information which could reflect the logical combination between the according machine words of the bitmaps 7Cr, 7G and 7B. Again, however, to derive estimated hit count data from this result bitmap 7Rf it is only necessary to go through these machine words 10$h$ and count the hit-relevant bit values in these machine words 10$h$ and multiply this fuzzy number by N.

Concerning the value of N and the significance of the estimated hit count reference is made to the statistical discussion of N and the size of the dataset in connection with the result bitmap 7R of FIG. 4.

Now in case a user wants to have the datasets of the first ten hits of a query there might be the risk that the first machine word 10$h$ of the result bitmap 7Rf contains only e.g. six hits. The next four hits may be hidden in the skipped machine words. Now to provide the user with the selected result dataset (e.g. first ten hits, last ten hits or twenty hits in series at an arbitrary position of the result bitmap 7Rf etc.) the method according to a preferred embodiment of the invention scans e.g. the first machine word 10$h$ in the result bitmap 7Rf, determines whether all required result datasets are represented, what would be the fact if by checking this first machine word 10$h$ ten hits are found. If this is not true the system makes a post calculation for the missing result data sets by accessing the following machine word 10$s$ (indicated in dashed lines in FIG. 5) in the bitmaps 7Cr, 7G and 7B, making the respective logical combinations and setting the according bits in the machine word 10hc following the first machine word 10$h$ of the result bitmap 7Rf. The system checks whether or not the selected result datasets are available in the result bitmap 7Rf and repeats aforesaid process with the following yet unevaluated machine words in bitmaps 7Cr, 7G and 7B, until the user-defined number of selected result datasets is reaches in the result bitmap 7Rf. In this instance the completed entity of the selected result datasets is returned to a user interface and thus presented to the user.

The invention claimed is:

1. A computer implemented method of retrieving hit count data from a data base system by determining a number of hits in a result bitmap data structure comprising:
   scanning through the bitmap data structure accessing only each Nth machine word;
   determining a fuzzy number of hit-relevant bit values of each accessed machine word;
   calculating an estimated hit count by multiplying the fuzzy number by N; and outputting the estimated hit count from the data base system.

2. A method according to claim 1, wherein bit values of 1 each representing a hit are added to a counter to determine said fuzzy number.

3. A method according to claim 1, wherein N is in the order of 10 to 100.

4. A computer implemented method of retrieving hit count data from a data base system by determining a number of hits in a result bitmap data structure, comprising:
   generating a fuzzy result bitmap data structure from at least two bitmap structures representing certain data attributes by logically combining only each Nth machine words of both the bitmap structures;
   determining a fuzzy number of hit-relevant bit values of each valuable machine word in said fuzzy result bitmap data structure;
   calculating an estimated hit count by multiplying the fuzzy number by N; and
   outputting the estimated hit count from the data base system.

5. A method according to claim 4 for returning a defined number of selected result datasets from a fuzzy result bitmap structure, further comprising:

determining whether all required result datasets are represented by said fuzzy result bitmap structure;

post-calculating of missing result datasets by logical combination until the defined number of required result datasets is available in the fuzzy result bitmap data structure; and returning the completed entity of selected result datasets to a user interface.

6. A method according to claim 4, wherein bit values of 1 each representing a hit are added to a counter to determine said fuzzy number.

7. A method according to claim 4, wherein N is in the order of 10 to 100.

8. A computer-readable medium encoded with a computer program for retrieving hit count data from a data base system by determining a number of hits in a result bitma data structure the computer program comprising instructions that when executed operate to cause one or more computers to perform operations comprising:

scanning through the bitmap data structure accessing only each Nth machine word;

determining a fuzzy number of hit-relevant bit values of each accessed machine word;

calculating an estimated hit count by multiplying the fuzzy number by N; and outputting the estimated hit count from the data base system.

9. The computer-readable medium of claim 8, wherein bit values of 1 each representing a hit are added to a counter to determine said fuzzy number.

10. The computer-readable medium of claim 8, wherein N is in the order of 10 to 100.

11. A computer-readable medium encoded with a computer program for retrieving hit count data from a data base system by determining a number of hits in a result bitmap data structure, the computer program comprising instructions that, when executed, operate to cause one or more computers to perform operations comprising:

generating a frizzy result bitmap data structure from at least two bitmap structures representing certain data attributes by logically combining only each Nth machine words of both the bitmap structures;

determining a fuzzy number of hit-relevant bit values of each valuable machine word in said fuzzy result bitmap data structure;

calculating an estimated hit count by multiplying the fuzzy number by N; and outputting the estimated hit count from the data base system.

12. The computer-readable medium of claim 11, wherein the operations further comprise:

determining whether all required result datasets are represented by said fuzzy result bitmap structure;

post-calculating of missing result datasets by logical combination until the defined number of required result datasets is available in the fuzzy result bitmap data structure; and returning the completed entity of selected result datasets to a user interface.

13. The computer-readable medium of claim 11, wherein bit values of 1 each representing a hit are added to a counter to determine said fuzzy number.

14. The computer-readable medium of claim 11, wherein N is in the order of 10 to 100.

* * * * *